United States Patent
Andersson et al.

(10) Patent No.: US 10,378,390 B2
(45) Date of Patent: Aug. 13, 2019

(54) INTERNAL COMBUSTION ENGINE SYSTEM WITH HEAT RECOVERY

(71) Applicant: VOLVO TRUCK CORPORATION, Göteborg (SE)

(72) Inventors: Lennart Andersson, Varberg (SE); Arne Andersson, Mölnlycke (SE); Peter Mårdberg, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 247 days.

(21) Appl. No.: 15/319,763

(22) PCT Filed: Jun. 26, 2014

(86) PCT No.: PCT/EP2014/001743
§ 371 (c)(1),
(2) Date: Dec. 17, 2016

(87) PCT Pub. No.: WO2015/197087
PCT Pub. Date: Dec. 30, 2015

(65) Prior Publication Data
US 2017/0122131 A1    May 4, 2017

(51) Int. Cl.
*F01K 23/06* (2006.01)
*F02G 5/00* (2006.01)
(Continued)

(52) U.S. Cl.
CPC ............ *F01K 23/065* (2013.01); *F01K 23/14* (2013.01); *F02G 5/00* (2013.01); *F02G 5/02* (2013.01); *Y02T 10/166* (2013.01)

(58) Field of Classification Search
CPC ............ F01K 23/065; F02G 5/02; F01N 5/02
(Continued)

(56) References Cited

U.S. PATENT DOCUMENTS

| 4,366,674 A | 1/1983 | Eakman |
| 4,570,077 A * | 2/1986 | Lambley .................... B63J 3/02 290/1 R |

(Continued)

FOREIGN PATENT DOCUMENTS

| DE | 3111799 A1 | 10/1982 |
| EP | 1243758 A1 | 9/2002 |

(Continued)

OTHER PUBLICATIONS

Japanese Official Action (dated Jun. 5, 2018) for corresponding Japanese App. 2016-575167.

(Continued)

*Primary Examiner* — Ngoc T Nguyen
(74) *Attorney, Agent, or Firm* — WRB-IP LLP (57) ABSTRACT

An internal combustion engine system with heat recovery includes an internal combustion engine with a waste heat passage, an electric motor, a heat recovery assembly including a working fluid circulation circuit with a working fluid, a first heat source which is adapted to be heated by the waste heat passage and adapted to heat the working fluid, and an expander engine, which is operated by the heated working fluid, and a splitting device, which is connected to the electric motor and is adapted to be connected to a drivetrain of a vehicle and which splitting device is further connected to the expander engine, so that the expander engine is enabled to drive the drivetrain and/or the electric motor. The internal combustion engine system further includes at least a second heat source for providing heat to the heat recovery assembly. A vehicle including such an internal combustion engine system is also provided.

21 Claims, 3 Drawing Sheets

(51) Int. Cl.
*F02G 5/02* (2006.01)
*F01K 23/14* (2006.01)

(58) Field of Classification Search
USPC .................................................. 60/616–620
See application file for complete search history.

(56) References Cited

U.S. PATENT DOCUMENTS

| | | | | |
|---|---|---|---|---|
| 8,584,457 B2* | 11/2013 | Kardos | ..................... | F01P 3/20 123/41.31 |
| 2003/0115877 A1 | 6/2003 | Bara et al. | | |
| 2004/0060292 A1* | 4/2004 | Minemi | ................. | F01B 17/04 60/616 |
| 2005/0229595 A1 | 10/2005 | Hoetger et al. | | |
| 2005/0262842 A1* | 12/2005 | Claassen | ............... | F01K 23/065 60/618 |
| 2007/0227472 A1 | 10/2007 | Takeuchi et al. | | |
| 2009/0211253 A1* | 8/2009 | Radcliff | ................ | F01K 23/065 60/670 |
| 2012/0036850 A1 | 2/2012 | Ernst et al. | | |
| 2013/0098030 A1* | 4/2013 | Freund | ..................... | F01N 5/02 60/599 |
| 2013/0219872 A1* | 8/2013 | Gibble | ................... | F01K 15/02 60/320 |
| 2013/0318967 A1 | 12/2013 | Gaertner et al. | | |

FOREIGN PATENT DOCUMENTS

| | | |
|---|---|---|
| JP | 2001227616 A | 8/2001 |
| JP | 2006510840 A | 3/2006 |
| JP | 2014504345 A | 2/2014 |
| WO | 2012061812 A2 | 5/2012 |

OTHER PUBLICATIONS

International Search Report (dated Aug. 29, 2014) for corresponding International App. PCT/EP2014/001743.

* cited by examiner

INTERNAL COMBUSTION ENGINE SYSTEM WITH HEAT RECOVERY

BACKGROUND AND SUMMARY

The present invention relates to an internal combustion engine system with heat recovery comprising an internal combustion engine with a waste heat passage, an electric motor, a heat recovery assembly comprising a working fluid circulation circuit with a working fluid, a first heat source which is adapted to be heated by the waste heat passage and adapted to heat the working fluid, and an expander engine, which is operated by the heated working fluid, and a splitting device, which is connected to the electric motor and is adapted to be connected to a drivetrain of a vehicle and which splitting device is further connected to the expander engine, so that the expander engine is enabled to drive the drivetrain and/or the electric motor.

In the following, the term "ICE operation modes" is used as abbreviation of "internal combustion engine (ICE) operation modes". "High load ICE operation modes" are defined as ICE operation modes, where the driving situation requires a lot of driving force, e.g. running uphill or accelerating. "Normal load ICE operation modes" are defined as ICE operation modes, where the vehicle is neither substantially accelerating nor substantially decelerating, e.g. the vehicle is running at constant speed on a high way. "Low load ICE operation modes" are defined as ICE operation modes, where the vehicle requires little driving force, e.g. when the vehicle is running downhill, decelerates or is in motoring or idle engine operation modes (see below). "No load ICE operation modes" are defined as ICE operation modes, where the internal combustion engine is stopped.

The above mentioned idle engine operation mode describes all engine operation states where the engine is running at idle speed. Idle speed is the rotational speed the engine runs on when the engine is decoupled from the drivetrain and the accelerator of the internal combustion engine is released. Usually the rotational speed is measured in revolutions per minute or rpm of the crankshaft of the engine. At idle speed, the engine generates enough power to run reasonable smoothly and to operate accessory equipment (water pump alternator, and other accessories such as a power steering) but usually not enough to perform useful work such as moving the vehicle. For vehicles such as trucks or cars, idle speed is customarily between 600 rpm and 1000 rpm. Even if the accelerator is released, a certain amount of fuel is injected into the internal combustion engine in order to keep the engine running. If the engine is operating a large number of accessories, par-ticularly air conditioning, the idle speed must be raised to ensure that the engine generates enough power to run smoothly and operate the accessories. Therefore, most engines have an automatic adjustment feature in the carburetor of the fuel injection system that raises the idle speed when more power is required.

The above mentioned motoring engine operation mode is defined as the mode, where the engine is running above a certain rotational speed (rpm) but no fuel is injected into the engine. One example of a motoring engine operation mode is when the engine is dragging, i.e. the vehicle, which is normally driven by the engine, is coasting down a hill. During that mode the accelerator is also released but the engine remains coupled to the drivetrain and the engine is kept running by the drive fuse of the gearbox main shaft.

The above mentioned heat recovery assembly is usually adapted to use waste heat of an internal combustion engine for other purposes, such as producing electric energy. From the state of the art a plurality of heat recovery assemblies are known. One of them is based on a Rankin cycle, which uses heat of an exhaust gas of the internal com-bustion engine for heating a working fluid which in turn drives an expander engine for generating electric energy.

The working fluid of a heat recovery assembly based on a Rankin cycle usually cycles through four stages, wherein in a first stage a liquid working fluid is pumped from low to high pressure. In the subsequent stage, the high pressure liquid working fluid enters a heating device, where it is heated by an external heat source, preferably a waste heat source of an internal combustion engine system, to be converted into its gaseous phase. In the next stage, the gaseous phase working fluid expands through an expander engine, for example a displacement expander, such as a piston engine, and/or a turbine, which is driven by the thermal energy of the working fluid. In its last stage, the working fluid is cooled down in a condenser and converted back to its liquid phase.

Disadvantageously, in conventional heat recovery assemblies the energy generation and the energy distribution generated of the heat recovery assembly cannot be controlled. Additionally, conventional heat recovery assemblies produce either electric energy or mechanical energy. For an expander engine producing electric energy this means e.g. that during high load ICE operation modes electric energy is generated in excess, wherein during low load ICE operation modes not enough electric energy is generated. If the heat recovery assembly acts as auxiliary power unit, the provision of additional propulsion energy may even be unwanted in low load ICE operation modes, particularly when the vehicle is running downhill.

It has therefore been suggested in the state of the art, e.g. EP 1 243 758 A1, to provide both a displacement expander for providing mechanical energy and an electric motor for generating electrical energy, which are connected by a Continuously Variable Transmission (CVT) for distributing and controlling the amount of energy produced by the displacement expander and by the electric motor.

However, even the transmission (CVT) disclosed in EP 1 243 758 A1 does not sufficiently solve the problem, as the CVT is expensive, interference-prone and needs a sophisticated control. Additionally, the CVT has a low efficiency due to energy losses at the transmission, which reduces the overall efficiency of the waste heat recovery system to such an extent that the energy surplus of the heat recovery system is negligible.

A further known problem of the conventional heat recovery assemblies occurs during low load ICE operation modes. During low load ICE operation modes, the temperature of the exhaust gas of the internal combustion engine decreases significantly, as the internal combustion engine more or less pumps fresh air at ambient temperature into the ex-haust gas system. A heat exchanger arranged at the exhaust gas system for operating the heat recovery assembly decreases the exhaust gas temperature even further. This results in at least two disadvantages:

i. The temperature of the exhaust gas is not sufficient for vaporizing the working fluid, thereby rendering the heat recovery assembly inoperable.

ii. An optionally arranged exhaust gas aftertreatment system, which usually requires a working temperature between roughly 250° C. and 450° C., is cooled below its working temperature.

Consequently, after a long period of low load ICE operation mode, e.g. after a downhill course, neither the heat recovery assembly nor the exhaust gas aftertreatment system are working properly.

It is desirable to provide an internal combustion engine system with a heat recovery system providing an improved energy distribution, wherein the heat recovery assembly is operable during all ICE operation modes.

According to a first aspect of the disclosure an internal combustion engine system with heat recovery is disclosed which comprises an internal combustion engine with a waste heat passage, an electric motor, a heat recovery assembly comprising a working fluid circulation circuit with a working fluid, a first heat source which is adapted to be heated by the waste heat passage and adapted to heat the working fluid, and an expander engine, which is operated by the heated working fluid, and a splitting device, which is connected to the electric motor and is adapted to be connected to a drivetrain of a vehicle and which splitting device is further connected to the expander engine, so that the expander engine is enabled to drive the drivetrain and/or the electric motor. The first heat source may e.g. be waste heat of the internal combustion engine through the waste heat passage. The splitting device may e.g. be a clutch or a power split. In case the expander engine is connected to the drivetrain of the vehicle, the expander engine is enabled to support the internal combustion engine in propelling the vehicle. In case the expander engine is connected to the electric motor, the expander engine is enabled to produce electric energy for driving an electric consumer.

The present disclosure is based on the idea to provide at least a second heat source for providing heat to the heat recovery assembly. Such a second heat source may be used for operating the heat recovery assembly, for example when the heat of the exhaust gas system of the internal combustion engine cannot provide enough heat or when the internal combustion engine is stopped, consequently producing no heat at all. Insufficient amounts of heat may also be produced during low load ICE operation modes, particularly during idle or motoring ICE operation modes.

During the above described low load ICE operation modes, the internal combustion engine is in principle pumping fresh air to the exhaust gas system whereby the temperature of the exhaust gas drops. Consequently, not enough heat is provided for vaporizing the working fluid and therefore operating the expander engine. A further disadvantage during such operating modes is that the exhaust gas aftertreatment system is air cooled in an uncontrolled and unwanted manner. In such cases, the second heat source may be activated for producing heat for operating the expander engine and for keeping the exhaust gas aftertreatment system within its working temperature range.

According to an embodiment the heat recovery assembly is adapted to be operable independently from operation of the internal combustion engine.

With this feature it is possible to operate the heat recovery assembly at another rate (or speed) than what would have been the case if it was operated together with the internal combustion engine. The heat recovery assembly may be operated at a higher or at a lower rate than the internal combustion engine. Hence it is enabled to operate the heat recovery assembly independently from the internal combustion engine.

According to an embodiment the second heat source is adapted to be operable independently from operation of the internal combustion engine.

With this feature it is possible to operate the second heat source at another rate (or speed) than what would have been the case if it was operated together with the internal combustion engine. The second heat source may be operated at a higher or at a lower rate (or speed) than the internal combustion engine. Hence it is enabled to operate the second heat source independently from the internal combustion engine. In particular this is advantageous when more energy is needed from the internal combustion engine system than what the internal combustion engine is able to deliver. In such a case the second heat source may provide heat to the heat recovery assembly, which in turn delivers energy to the splitting device where it may be further delivered to an energy consumer.

According to an embodiment the heat recovery assembly and/or the second heat source is adapted to be operable when the internal combustion engine is shut off.

In particular this feature is advantageous when the internal combustion engine has been shut off such that it cannot deliver any energy at all. The heat recovery assembly and/or the second heat source may instead be the source of energy production and delivery through the splitting device to an energy consumer. Generally, providing a second heat source has the advantage that in case the demand for the combustion engine is low, it is possible to stop the internal combustion engine completely, and to drive the vehicle with help of the expander engine, only. Additionally, when the vehicle is at standstill and used as a sleeper, electric energy can be provided by the heat recovery assembly, which is operated by the second heat source. Advantageously, the heat recovery assembly may also drive the drivetrain of the vehicle, which in turn enables a driver to drive the vehicle without starting the internal combustion engine. This is particularly preferred for moving trucks or motorhomes at a parking lot or on a camp site.

As mentioned above, the second heat source may heat the working fluid of the heat recovery assembly or the exhaust gas system. In the latter case, heating the exhaust gas system may be performed by producing hot exhaust gas or by heating the exhaust gas of the internal combustion engine. Heating the exhaust gas system has the advantage that the exhaust gas aftertreatment system may be kept within its working temperature range even during a standstill period or during low load ICE operation modes so that a cold start of the exhaust gas aftertreatment may be avoided. According to an embodiment the second heat source is a heater for heating the working fluid of the heat recovery assembly.

According to an embodiment the waste heat passage is an exhaust gas system comprise at least an exhaust gas aftertreatment system for guiding at least part of an exhaust gas from the internal combustion engine to an environment.

According to an embodiment, the second heat source is a heater for heating the exhaust gas in the exhaust gas system. It is further possible to provide even more than one additional heat source, particularly a second heat source as heater for heating the exhaust gas and a third heat source for heating the working fluid. The one and the same second heat source may also be arranged to heat one or several of these items in combination.

According to an embodiment the second heat source is a burner for burning fuel, comprising a fuel inlet and an air inlet, and an exhaust gas outlet, which is connected to the exhaust gas system of the internal combustion engine for providing hot exhaust gases to the exhaust gas system. The hot exhaust gas of the burner may be used for operating the heat recovery assembly by exchanging heat at the heat exchangers and for keeping the exhaust gas aftertreatment system within its working temperature range.

According to an embodiment, the exhaust gas outlet of the burner is connected to the exhaust gas system (16) of the internal combustion engine upstream of the exhaust gas aftertreatment system Instead of providing an extra burner, it is also possible to use an already existing preheating system for the exhaust gas aftertreatment system as second heat source.

According to an embodiment, the heat recovery assembly further comprises at least one heat exchanger, which is connected to a waste heat source of the internal combustion engine. Usually, the internal combustion engine has an exhaust gas outlet side, which is connected to an exhaust gas system comprising at least an exhaust gas duct, an optional turbine for driving a turbocharger and an optional exhaust gas aftertreatment system. The exhaust gas system may further comprise an exhaust gas recirculation system for recirculating exhaust gas to the internal combustion engine and a cooling device for cooling the recirculated exhaust gas. Waste heat of the internal combustion engine, which may be hot exhaust gas, streams through the exhaust gas system of the internal combustion engine, which may be used for operating the heat recovery assembly. For that at least one heat exchanger may be arranged at a suitable location in the exhaust gas system.

A different source of waste heat may be the cooling system of the internal combustion engine. Instead of using a radiator for cooling the internal combustion engine coolant, a heat exchanger may be used which is adapted to vaporize the working fluid of the heat recovery assembly by using the heat of the coolant. The coolant in turn is cooled down.

Advantageously in all cases, the thermal energy of the waste heat may be converted by the expander engine into electric or mechanical energy, which may be used for operating electric devices or as auxiliary power for the propulsion of the vehicle.

According to an embodiment, at least one heat exchanger is arranged at the ex-haust gas duct itself, downstream or upstream of an optional exhaust gas aftertreatment system and/or at an exhaust gas recirculation duct (EGR duct). Arranging the heat exchanger downstream of the exhaust gas aftertreatment system has the advantage that the hot exhaust gas leaving the exhaust gas aftertreatment system may be used. Since the exhaust gas aftertreatment system is operating in a working temperature range between ca. 250° C. and 450° C., also the exhaust gas leaving the exhaust gas aftertreatment system has a comparable temperature range. This temperature may even be higher than the temperature of the exhaust gas upstream of the exhaust gas aftertreatment system. For instance, this may be the case if a turbine is used for driving a turbocharger, which is arranged upstream of the exhaust gas aftertreatment system. Arranging the heat exchanger upstream of the exhaust gas aftertreatment system amplifies the cooling of the exhaust gas upstream of the exhaust gas aftertreatment system. Cooling the exhaust gas upstream of the exhaust gas aftertreatment system in turn may cause a significant temperature drop in the exhaust gas aftertreatment system, which compromises its efficiency.

According to an embodiment, a first heat exchanger is arranged downstream of the exhaust gas aftertreatment system and a second heat exchanger is arranged upstream of the exhaust gas aftertreatment system. The advantage of such an arrangement is twofold:

i. If the temperature of the exhaust gas upstream of the exhaust gas after-treatment is very high, particularly exceeding the working temperature of the exhaust gas aftertreatment system, the working fluid can be superheated by the second heat exchanger, which increases the energy exploit of the expander engine.

Simultaneously, the temperature of the exhaust gas is lowered into the working temperature range of the exhaust gas aftertreatment system, whereby the life time of the exhaust gas aftertreatment system is prolonged.

ii. If the temperature of the exhaust gas is low, particularly below the working temperature range of the exhaust gas aftertreatment system, the second heat exchanger heats the exhaust gas, whereby the exhaust gas aftertreatment system may be kept within its working temperature range.

In the preferred case, where two heat exchangers are arranged upstream and downstream of the exhaust gas aftertreatment system, the additional heat source is preferably arranged between the two heat exchangers. Thereby, the hot working fluid may also heat the exhaust gas upstream of the exhaust gas aftertreatment system. The hot exhaust gas upstream of the exhaust gas aftertreatment system in turn keeps the exhaust gas aftertreatment in its working temperature range. The heat exchanger downstream of the exhaust gas aftertreatment system in turn returns part of the heat to the working fluid circuit.

According to an embodiment, at least one of the heat exchangers may be arranged at an exhaust gas recirculation duct of an internal combustion engine with exhaust gas recirculation (EGR engine). In an EGR engine, the emissions of the internal combustion engine are reduced by recirculating part of the total exhaust gas flow. The recirculated sub-flow of exhaust gas is cooled before fed into the gas intake side of the EGR engine, where it is mixed with incoming air before the mixture is introduced into the cylinders of the EGR engine. Cooling of the recirculated exhaust gas is preferable for the EGR engines as recirculating hot exhaust gas would increase the temperature of the gas at the gas intake side of the EGR engine to a level, which otherwise could damage the EGR engine. Moreover, recirculation of exhaust gas amounts in the range of 15-30% of the total mass flow through the EGR engine is desirable for yielding a sufficient NOx reduction. Thereby, the cooler of the EGR engine may be used for simultaneously heating the working fluid and cooling the recirculated exhaust gas. Preferably, also in the EGR system with heat recovery, a second heat exchanger arranged upstream of the exhaust gas after-treatment system may be used, providing the above discussed advantages.

According to an embodiment the splitting device may be at least one clutch or a clutch arrangement, which is operated to connect and disconnect the drivetrain and/or the electric motor. Additionally or alternatively, an epicyclic or planetary gear power split device may be used.

Regardless what kind of splitting device is used, the advantage of the simple splitting device is that it only connects or disconnects the expander engine to the drivetrain and to the electric motor and does not distribute the power of the expander to the drivetrain and the electric motor as known from the state of the art.

Further, the splitting device may be adapted to provide a connection between the drivetrain and the electric motor.

According to an embodiment, the electric motor may be connected to an electric energy storing device such as a battery or a capacitor. With this arrangement, it is even possible to decouple the heat recovery assembly, namely the expander engine, completely and drive the drivetrain by means of the electric motor, only.

Alternatively or additionally, the splitting device may be operated in such a way that the drivetrain is connected to the electric motor. Thereby, the electric motor may be used as electric motor, which may drive the drivetrain of the vehicle. Further, a power storing device, such as a battery, may be present, which is adapted to drive the electric motor. On the other hand, when the electric motor is driven by the expander engine or by the drivetrain, electric energy may be produced by the electric motor and stored in the power storing device.

According to an embodiment the second heat source is adapted to run on the same fuel as the internal combustion engine, which simplifies the design internal combus-tion engine system.

According to an embodiment the expander engine is adapted to operate the electric motor as generator for providing electric energy to a vehicle.

According to a second aspect a vehicle is disclosed which comprises an internal combustion engine system of the above disclosed kind.

According to an embodiment the vehicle comprises further auxiliary equipment, such as a heating system for a passenger cab, wherein the electric motor is operably connected to the auxiliary equipment for operation thereof.

Further advantages and preferred embodiments are described in the attached claims, the specification and the drawings.

BRIEF DESCRIPTION OF THE DRAWINGS

In the following, the invention will be described by means of preferred embodiments shown in the Figures. However, it should be noted that the Figures are exemplary only and are not intended to limit the scope of the protection thereto, which is defined by the attached claims only.

The Figures show.

DETAILED DESCRIPTION

In the following same or similarly functioning parts are indicated by same reference numerals.

Figure 1A:
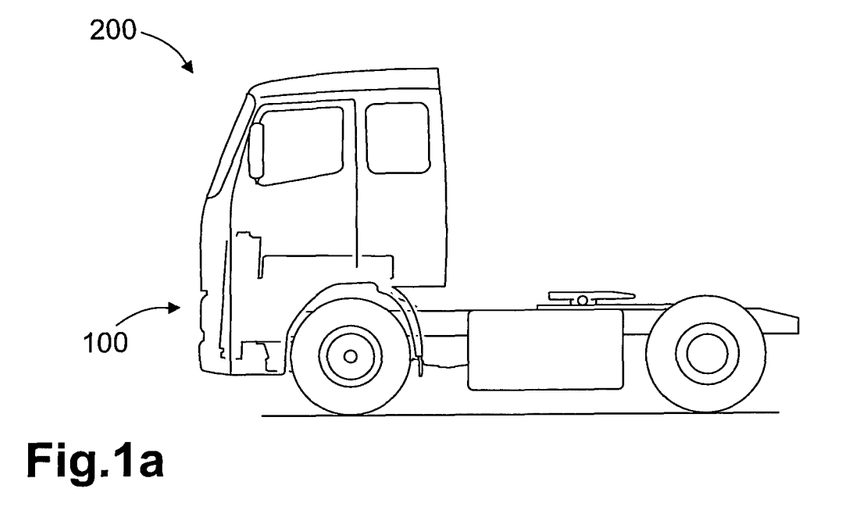
FIG. 1a a schematic view of a heavy duty truck comprising the internal combustion engine system of the kind disclosed herein.

FIG. 1b to FIG. 5 show different embodiments of an internal combustion engine sys-tem with heat recovery 100, wherein a heat recovery assembly 1 is connected to an internal combustion engine 12 of a vehicle 200 of a kind shown in FIG. 1a. Thereby, waste heat of the internal combustion engine 12 may be used as heat source for the heat recovery assembly 1. The heavy duty truck 200 disclosed in FIG. 1a is merely one example of a type of vehicle 200 for which the present disclosure is advantageous. Other types may be pas-senger cars or trucks of any kinds. The vehicle 200 may be provided with an internal combustion engine system 100 of any embodiment disclosed herein.

Figure 1B:
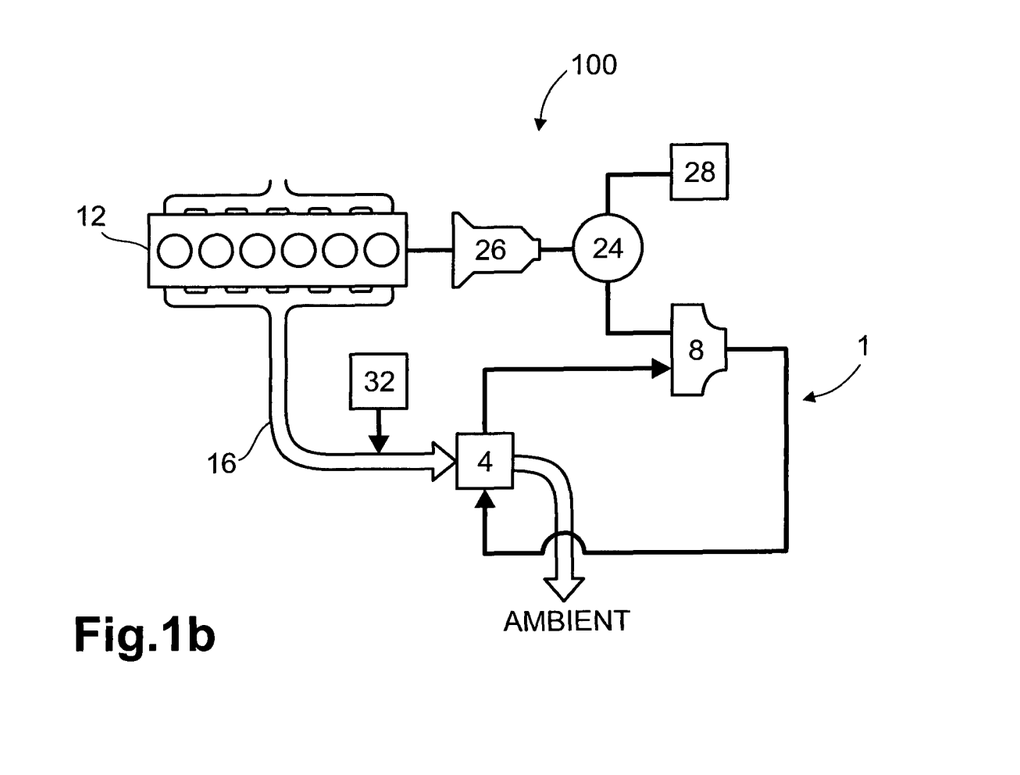
FIG. 1b a schematic illustration of an internal combustion engine system according to the disclosure.

FIG. 1b discloses an embodiment of the present disclosure. It discloses an internal combustion engine system 00 with heat recovery and comprises an internal combustion engine 12 with a waste beat passage 16. It should be noticed that the waste heat may have many sources. For example it may be heat which is cooled off from the internal combustion engine 12 or from any system connected to the vehicle 200. Waste heat may consequently also be heat cooled off from for example an Exhaust Gas Recirculation (EGR) circuit (not disclosed in FIG. b).

It further discloses an electric motor 28 and a heat recovery assembly 1. The heat recovery assembly 1 comprises a working fluid circulation circuit with a working fluid. The heat recovery assembly has a first heat source 4 which is adapted to be heated by the waste heat passage 16 and adapted to heat the working fluid, and an expander engine 8, which is operated by the heated working fluid. The internal combustion engine system 100 also discloses a splitting device 24, which is connected to the electric motor 28 and which is adapted to be connected to a drivetrain 26 of a vehicle. The splitting device 24 is further connected to the expander engine 8, so that the expander engine 8 is enabled to drive the drivetrain and/or the electric motor 28. The internal combustion engine system 100 also comprises a second beat source 32 for providing heat to the heat recovery assembly.

Figure 2:
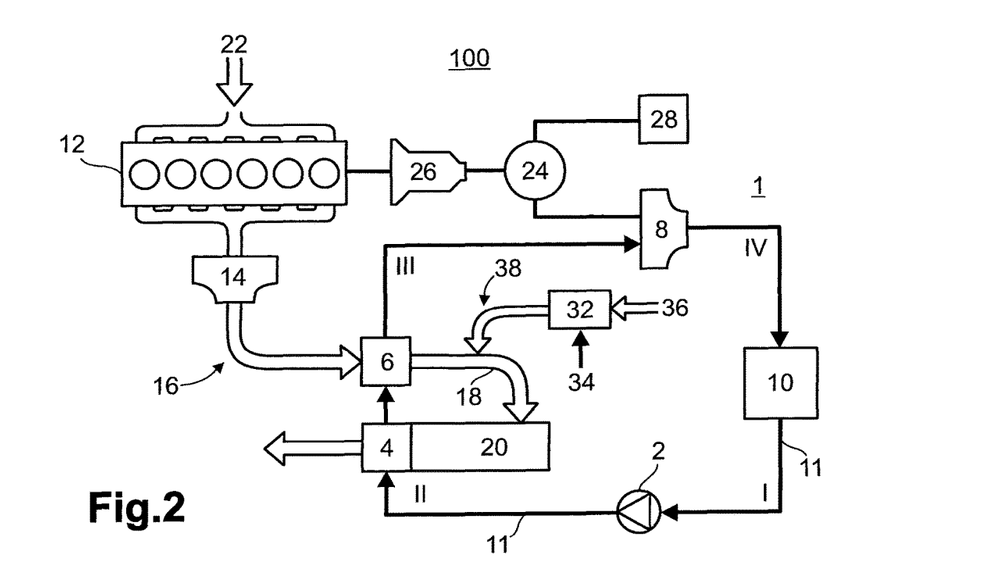
FIG. 2 a schematic illustration of an embodiment of the disclosure.

Referring now to FIG. 2, the heat recovery assembly 1 comprises a pump 2, a first heat exchanger 4, a second heat exchanger 6, an expander engine 8 and a condenser 10, which are interconnected by a working fluid circulation circuit 11.

Thereby the heat recovery 1 assembly works as follows: In the first stage I the cool liquid working fluid streams to the pump 2, where the cool liquid working fluid is pressurized to a predetermined pressure above ambient air pressure. Then the pressurized liquid working fluid is transported to the heat exchangers 4, 6, where it is heated and converted from its liquid phase to its gaseous phase. Due to the conversion to the gaseous phase the pressure may be increased once more. The pressurized gaseous phase working fluid then streams to the expander engine 8, where the thermal energy is converted to mechanical and optionally subsequently to electric energy. Mechanical energy can be creat-ed by e.g. a displacement engine, such as a piston engine, where the pressurized working fluid operates a piston, or by a turbine. Alternatively, the expander engine 8 may operate an electric motor 28 for generating electrical energy. The pressure of the working fluid is used to displace e.g. the piston or to operate the turbine or the electric motor. Consequently, the pressure of the working fluid drops so that in the fourth stage IV, the working fluid has a low pressure, even if it is still in its gaseous phase. The low pressure gaseous phase working fluid is subsequently transported to a condenser 10, where the working fluid is cooled below its dew point and thereby converted back into its liquid phase.

The working fluid for such a heat recovery assembly 1 can be a pure liquid e.g. water or ethanol or ammonia, or a mixture of e.g. water with e.g. ammonia or ethanol, or even a water/ammonia/ethanol mixture.

Particularly, for the application in a vehicle 200, the use of ammonia is further advantageous as ammonia or an ammonia compound, namely urea, may already be present in the vehicle 200. In case the exhaust gas aftertreatment system uses a selective catalytic reduction unit (SCR unit) for reducing NOx compounds in the exhaust gas, urea or am-monia may be used as reduction agent.

As depicted in FIGS. 2 to 5, the heat exchangers 4 and 6 are in heat exchanging connection to an exhaust gas system 16 of an internal combustion engine 12. The exhaust gas system 16 comprises a turbine 14, an exhaust gas duct 18 which is indicated in the figures by the bold arrows, and an exhaust gas aftertreatment system 20. Further, the internal combustion engine 2 comprises a gas intake side 22, where fuel and air are mixed in the known way and fed to the internal combustion engine 12.

The exhaust gas aftertreatment system 20 and the heat exchanger 4 may be integrated into a single device, but it is also possible that heat exchanger 4 and exhaust gas aftertreatment system 20 are separate units.

Even if in several of the illustrated embodiments two heat exchangers 4 and 6 are present, it is also possible, like in FIG. 1b, that only heat exchanger 4, which is arranged downstream of the exhaust gas aftertreatment system 20, is provided. This has the advantage that the exhaust gas of the combustion engine 12 is not cooled before it reaches the exhaust gas aftertreatment system 20. Such an embodiment may be combined with any one of the disclosed embodiments of the present disclosure.

Further, also only heat exchanger 6 may be present. Besides heating the working fluid, this heat exchanger enables an active cooling of very hot exhaust gas. Very hot exhaust gas, /.e. exhaust gas which has temperature above the working temperature of the exhaust gas aftertreatment system, may damage the exhaust gas aftertreatment system.

In a system, where at least two heat exchangers 4 and 6 are provided, as e.g. depicted in FIG. 2, the cooling down effect of the second beat exchanger 6 to the exhaust gas is reduced as the working fluid streaming from heat exchanger 4 to heat exchanger 6 is already preheated. Additionally, in case the exhaust gas in exhaust gas duct 18 is cool, the heat exchanger 6 may be used for increasing the temperature of the exhaust gas. Cool exhaust may occur during low load ICE operation modes.

Even if only shown in FIG. 1b, it should be explicitly mentioned that instead of using the waste heat of the exhaust gas of the internal combustion engine 12 also the heat of a coolant for the combustion engine 12 can be used as heat source for the heat recovery assembly 1. Any one of the disclosed embodiments may consequently use waste heat from a waste heat passage 16.

According to the disclosure the expander engine 8 is connected to a splitting device 24. The splitting device 24 in turn may be connected to at least a drivetrain 26 and an electric motor 28, thereby enabling the expander engine 8 to either drive the drivetrain 26 or the electric motor 28. In the depicted embodiments the splitting device 24 is connected to a drivetrain 26 of a vehicle 200 for providing mechanical energy, and to an electric motor 28 for providing electric energy. Consequently, the expander engine 8 may be either connected to the drivetrain 26 of the vehicle 200, thereby acting as auxiliary power unit for the internal combustion engine 12 or connected to the electric motor 28 for producing electric energy for an accessory equipment of the vehicle 200.

The splitting device 24 may be a clutch, which is adapted to connect and disconnect the expander engine 8 to/from the drivetrain 26 and the electric motor 28. Besides the connection/disconnection of the expander engine 8 to/from the drivetrain 26 and the electric motor 28 respectively, the splitting device 24 may further be adapted to provide a connection between the electric motor 28 and the drivetrain 26, directly.

Consequently, the splitting device 24 is adapted to provide at least three connection states:

i. Expander Engine 8-Drivetrain 26

In this connection state, the expander engine 8, which is operated by the heat recovery assembly 1, serves as auxiliary power unit for providing auxiliary power to the drivetrain 26 of the vehicle 200, particularly during high load engine operation modes.

On the other hand, provided the heat recovery assembly 1 comprises a second heat source 32 (see detailed description below), the expander engine 8 may serve as sole propulsion engine for the drivetrain 26 and thereby for the vehicle.

ii. Expander Engine 8-Electric Motor 28

In this connection state, the expander engine 8 is connected to the electric motor 8, only. Thereby electric energy is produced by the heat recovery assembly 1 which may be stored in a storing device, or may be used for driving an electric consumer. In connection with a second heat source, e.g. a burner, this enables a driver to use a plurality of electric consumers during stand still without straining the battery.

iii. Electric Motor 28-Drivetrain 26

In this connection state, generation of the electric energy may be performed by the drivetrain of the vehicle 200, e.g. during braking (energy recuperation), as the electric motor 28 may be driven by the drivetrain 26. Another advantage with this mode is that during low load/high speed (rpm) the expander engine 8 adds friction without adding any power, and by decoupling it the total friction is reduced. On the other hand, the electric motor 28 may also be used as electric motor for driving the drivetrain 26 of the vehicle 200, thereby acting as sole or auxiliary power unit.

Besides the use of a clutch as splitting device 24, also any other splitting device 24 providing the above mentioned features may be used. A further example for such a split-ting device 24 is a planetary gear power split.

According to the disclosure, the internal combustion engine system with heat recovery 100 is further provided with an additional heating device 32, which is in FIG. 2 exemplified as burner. In burner 32 injected fuel (see arrow 34) is burned with air (see arrow 36) to produce hot exhaust gas 38 which is introduced into the exhaust gas system 16 of the internal combustion engine 12. Preferably, the hot exhaust gas 38 of the burner 32 is introduced into the exhaust gas duct 18 upstream of an exhaust gas aftertreatment system 20, so that the burner 32 can be used for both the preheating of the exhaust gas aftertreatment system 20 and the heating of the working fluid of the heat recovery assembly 1. Thereby cooling down of the exhaust gas aftertreatment system 20 below its working temperature can be avoided.

Moreover, at low loads e.g. in driving situations, where the dragging of the vehicle 200 is not sufficient for keeping the velocity, it is also possible to stop the internal combustion engine 12 and to provide energy to the drivetrain 26 only by means of the expander engine 8. Additionally, during standstill of the vehicle 200, e.g. in a parking lot or on a campsite electric consumers, such as an air condition, TV or radio can be operated by the electric energy provided by the heat recovery assembly 1 which is operated by the burner 32.

Arranging the burner 32 upstream of the exhaust gas aftertreatment system 20 has the further advantage that also the exhaust gas of the burner 32 may be treated by the exhaust gas aftertreatment system 20 and can be released to the atmosphere.

Figure 3:
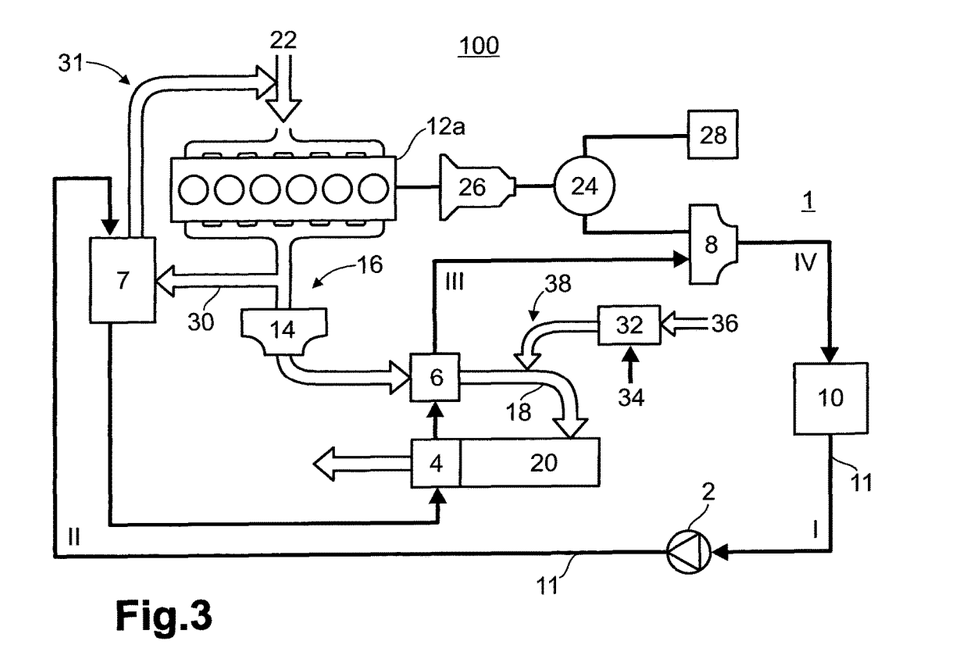
FIG. 3 a schematic illustration of an embodiment of the disclosure.

As already mentioned above, the waste heat of the internal combustion engine 12 may be recovered in a plurality of forms. In FIG. 2, the waste heat of the exhaust gas of an ordinary internal combustion engine 12 is used. Besides the arrangements of a heat exchanger 4, 6 at the exhaust gas system 18, at least one heat exchanger 7 of the heat recovery assembly 1 may be arranged at an exhaust gas recirculation duct 30 of an exhaust gas recirculation unit 31 (EGR engine 12a) as depicted in FIG. 3. In EGR engine 12a, part of the hot exhaust gas is recirculated to the gas intake side 22 of the internal combustion engine 12 for the reduction of NOx. However, since the hot exhaust gas would increase the temperature at the gas intake side 22 of the internal combustion engine 12 to such an extent that the internal combustion engine 2 would be damaged, at least one cooling device is arranged at the exhaust gas recirculation duct 30. This cooling device may be the heat exchanger 7, whereby synergetically the exhaust gas is cooled and the working fluid is heated. The at least one heat exchanger 7 is positioned in series with the heat exchangers 4, 6 in FIG. 3. It may however also be positioned in parallel with the heat exchangers 4, 6. Again, it may be that only one of the heat exchangers 4 and 6 are used, and preferably in such a case the first heat exchanger 4.

Figure 4:
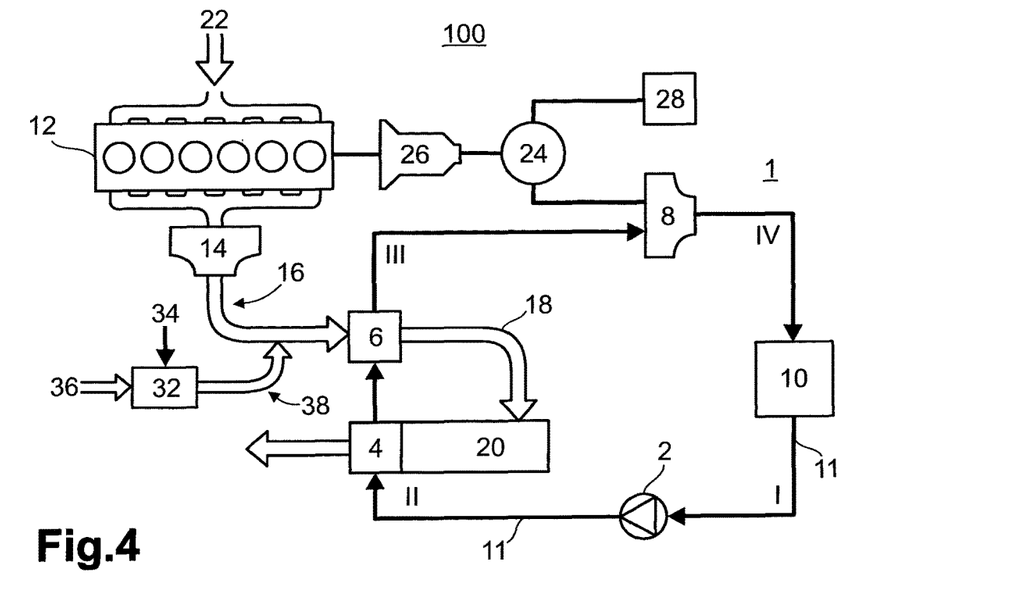
FIG. 4 a schematic illustration of an embodiment of the disclosure.

FIG. 4 depicts a further embodiment where the burner 32 is not only arranged upstream of the exhaust gas aftertreatment system 20, but also upstream of the second heat exchanger 6. Arranging the burner 32 upstream of the second heat exchanger 6 has the additional advantage that the working fluid of the heat recovery assembly 1 may be heated by the two-step process.

Figure 5:
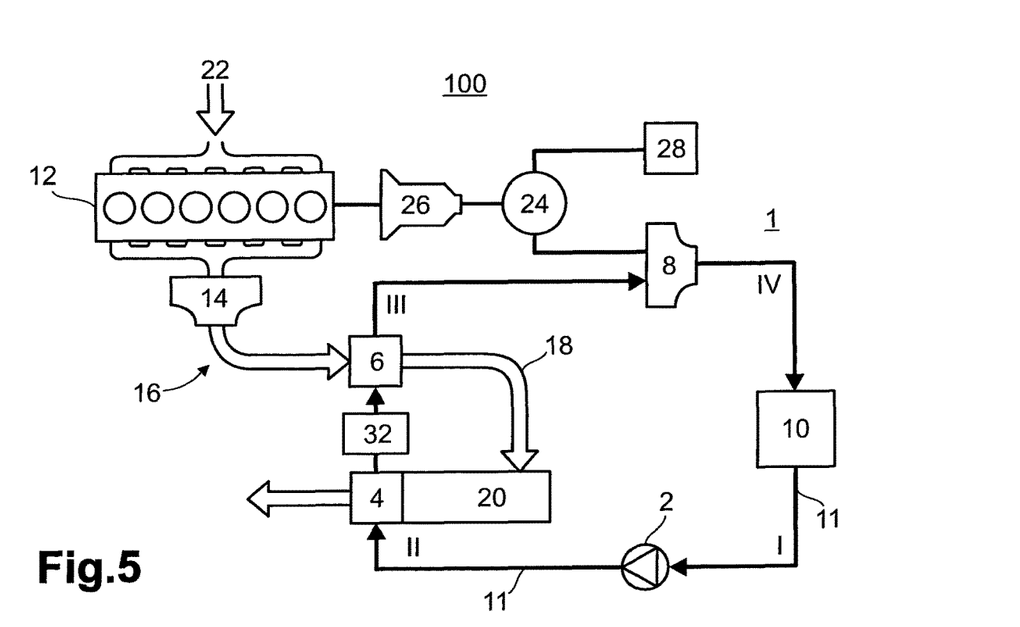
FIG. 5 a schematic illustration of an embodiment of the disclosure.

FIG. 5 illustrates a further embodiment for arranging the second heat source 32. Instead of heating the exhaust gas system 16 and thereby indirectly heating the working fluid of the heat recovery assembly 1, it is also possible to heat the working fluid directly. When there is a first heat exchanger 4 and a second heat exchanger 6 like in FIG. 5, and arranging the second heat source 32 for the working fluid between the first heat exchanger 4 and the second heat exchanger 6, the working fluid is heated directly and the exhaust gas system 16 is heated indirectly. Consequently, even with a direct heating of the working fluid, the above described advantages for operating the drivetrain 26 or the electric motor 28 without internal combustion engine 12 and/or for keeping the exhaust gas after-treatment system 20 within its working temperature range are achieved.

The second heat source 32 may also be used in combination with heating a passenger cab of the vehicle 200. This combination of heating both the internal combustion engine system 100 and the passenger cab is particularly useful e.g. when the vehicle 200 is standing still and the internal combustion engine 12 is not running. This is sometimes referred to as a hotel mode. The second heat source 32 may be utilised for preparing the internal combustion engine system 100 for later use and also at times to provide heating in an otherwise cold environment, such as during winter times, in the hotel mode. An exemplary passenger cab heater produces approx. 10 kW heat for proper heating of the cab. The efficiency of the heater may be approx. 20%. Hence, 10 kW×0.2=2 kW electricity is produced, which is what, in this exemplary embodiment, is sufficient for running the internal combustion engine system 100.

The condenser 10 may according to any one of the disclosed embodiments be connected to the ordinary cooling system of the vehicle 200. In such a case a simple yet efficient solution is achieved in which the ordinary cooling system is given additional functionality.

Even if not explicitly depicted in the figures, all discussed features may be likewise used with an EGR engine 2a, instead of an ordinary combustion engine 12.

Additionally, the internal combustion engine system with heat recovery 100 may have different waste heat sources, e.g. the exhaust gas, the recirculated exhaust gas, an exhaust gas recirculation passage and/or the internal combustion engine cooling system. However, the discussed arrangements of the elements of the internal combustion engine system with heat recovery 100, e.g. heat exchanger 4, 6, 7, second heat source 32, etc., also apply for different waste heat sources. Moreover, it is also possible to provide more than a first and second heat source.

It should be noted that the second heat source 32 in all of the above embodiments is different from and separate from any heat exchanger in the system.

Advantageously, the combustion engine system with heat recovery 100 is a more efficient way for exploiting the energy provided by the internal combustion engine 12. Since certain vehicles 200, such as long haul trucks, are often used with rather low de-mand in power, e.g. during use as a sleeper only a few kilowatt for heating or cooling, television etc. is necessary, operating the large diesel engine is waste of fuel. By the arrangement of a burner for heating the heat recovery assembly, electric energy can be provided at low fuel costs. Additionally, the burner helps keeping the exhaust gas after-treatment system within its working temperature range during low load engine operation modes or during stand still. It can hence be concluded that the heat recovery assembly, and particularly the second heat source, may be operated independently from the internal combustion engine. Also, the heat recovery assembly and the second heat source may be operated even when the internal combustion engine is shut off or standing still.

Thanks to the arrangement of a splitting device, such as a clutch, in combination with a second heat source, e.g. a burner, energy of the heat recovery assembly may be provided either to an electric motor for producing electric energy or to the drivetrain for propelling the vehicle itself. This results in an improved energy distribution possibility for flexibly providing energy where energy is required, even if the internal combustion engine is not working. Further, the second heat source may be used for heating the exhaust gas aftertreatment system prior to start and during low load ICE operation modes Additionally, when and if two heat exchangers one upstream and one downstream of the exhaust gas aftertreatment system are arranged, energy may be recovered at low load ICE operation modes. Arranging the second heat source, particularly a burner, up-stream of the exhaust gas aftertreatment system has the additional advantage that the exhaust gas from the burner may also be cleaned by the exhaust gas aftertreatment system.

The invention claimed is:

1. An internal combustion engine system with beat recovery comprising
an internal combustion engine with a waste heat passage;
an electric motor;
a heat recovery assembly comprising a working fluid circulation circuit with a working fluid, a first heat source which is adapted to be heated by the waste heat passage and adapted to heat the working fluid, and an expander engine, which is operated by the heated working fluid;
a splitting device, which is connected to the electric motor and is adapted to be connected to a drivetrain of a vehicle and which splitting device is further connected to the expander engine, so that the expander engine is enabled to drive the drivetrain and/or the electric motor; and at least a second heat source for providing heat to the heat recovery assembly, wherein at least one selected from a group of the heat recovery assembly and the second heat source is adapted to be operable independently from operation of the internal combustion engine and adapted to be operable when the internal combustion engine is shut off, wherein the second heat source is a heater for heating the working fluid of the heat recovery assembly, and wherein the second heat source is a heater for heating the exhaust gas in the exhaust gas system.

2. The internal combustion engine system according to claim 1, wherein the second heat source is a heater for heating the working fluid of the heat recovery assembly.

3. The internal combustion engine system according to claim 1, wherein the first heat source of the heat recovery assembly comprises at least one heat exchanger connected to a waste heat source of the internal combustion engine, wherein the waste heat source is waste heat from the exhaust gas system and/or from a cooling system of the internal combustion engine and/or from an exhaust gas recirculation system.

4. The internal combustion engine system according to claim 3, wherein the at least one heat exchanger is arranged at least one selected from a group of upstream or downstream of the exhaust gas aftertreatment system.

5. The internal combustion engine system according to claim 4, wherein the first heat exchanger is arranged downstream of the exhaust gas aftertreatment system and a second heat exchanger is arranged upstream of the exhaust gas aftertreatment system, and wherein the second heat source is arranged at the working fluid circulation circuit between the first and the second heat exchanger.

6. The internal combustion engine system according to claim 3, wherein the exhaust gas system further comprises a turbine of a turbocharger, wherein the at least one heat exchanger is arranged downstream of the turbine.

7. The internal combustion engine system according to claim 6, wherein the exhaust gas outlet of the burner is connected to the exhaust gas system of the internal combustion engine downstream of the turbine and upstream of the second heat exchanger.

8. The internal combustion engine system according to claim 1, wherein the internal combustion engine is an exhaust gas recirculation engine with an exhaust gas system comprising an exhaust gas recirculation unit with an exhaust gas recirculation duct and a cooling device for cooling the recirculated exhaust gas, wherein the exhaust gas recirculation duct is branched off upstream of a turbine for driving a turbocharger.

9. The internal combustion engine system according to claim 8, wherein the heat recovery assembly further comprises at least one heat exchanger arranged in the exhaust gas recirculation duct, wherein the heat exchanger is designed as the cooling device for the recirculated exhaust gas.

10. The internal combustion engine system according to claim 9, wherein the heat recovery system comprises a second heat exchanger which is arranged in an exhaust gas duct of the exhaust gas system downstream of the turbine and upstream of an exhaust gas aftertreatment system.

11. The internal combustion engine system according to claim 1, wherein the splitting device is an epicyclic or planetary gear power split.

12. The internal combustion engine system according to claim 1, wherein the heat recovery assembly is a Rankine cycle comprising at least one heat exchanger, the at least one expander engine, at least one condenser, and at least one pump.

13. The internal combustion engine system according to claim 1, wherein the second heat source is adapted to run on the same fuel as the internal combustion engine.

14. The internal combustion engine system according to claim 1, wherein the expander engine is adapted to operate the electric motor as generator for providing electric energy to a vehicle.

15. A vehicle comprising the internal combustion engine system according to claim 1.

16. The vehicle according to claim 15, further comprising auxiliary equipment, wherein the electric motor is operably connected to the auxiliary equipment for operation thereof.

17. An internal combustion engine system with heat recovery comprising an internal combustion engine with a waste heat passage;
an electric motor;
a heat recovery assembly comprising a working fluid circulation circuit with a working fluid, a first heat source which is adapted to be heated by the waste heat passage and adapted to heat the working fluid and an expander engine, which is operated by the heated working fluid;
a splitting device, which is connected to the electric motor and is adapted to be connected to a drivetrain of a vehicle and which splitting device is further connected to the expander engine, so that the expander engine is enabled to drive the drivetrain and/or the electric motor; and
at least a second heat source for providing heat to the heat recovery assembly, wherein at least one selected from a group of the heat recovery assembly and the second heat source is adapted to be operable independently from operation of the internal combustion engine and adapted to be operable when the internal combustion engine is shut off, wherein the waste heat passage is an exhaust gas system comprising an exhaust gas aftertreatment system for guiding at least part of an exhaust gas from the internal combustion engine to an environment, and wherein the second heat source is a heater for heating the exhaust gas in the exhaust gas system, wherein the second heat source is a heater for the exhaust gas aftertreatment system arranged in the exhaust gas system of the internal combustion engine.

18. The internal combustion engine system according to claim 17, wherein the splitting device is at least one clutch.

19. An internal combustion engine system with heat recovery comprising an internal combustion engine with a waste heat passage;
an electric motor;
a heat recovery assembly comprising a working fluid circulation circuit with a working fluid, a first heat source which is adapted to be heated by the waste heat passage and adapted to heat the working fluid, and an expander engine, which is operated by the heated working fluid;
a splitting device, which is connected to the electric motor and is adapted to be connected to a drivetrain of a vehicle and which splitting device is further connected to the expander engine, so that the expander engine is enabled to drive the drivetrain and/or the electric motor; and at least a second heat source for providing heat to the heat recovery assembly, wherein at least one selected from a group of the heat recovery assembly and the second heat source is adapted to be operable independently from operation of the internal combustion engine and adapted to be operable when the internal combustion engine is shut off, wherein the waste heat passage is an exhaust gas system comprising an exhaust gas aftertreatment system for guiding at least part of an exhaust gas from the internal combustion engine to an environment, and wherein the second heat source is a heater for heating the exhaust gas in the exhaust gas system, wherein the second heat source is a burner for burning fuel comprising a fuel inlet and an air inlet, and an exhaust gas outlet which is connected to the exhaust gas system of the internal combustion engine for providing hot exhaust gases to the exhaust gas system.

20. The internal combustion engine system according to claim 19, wherein the exhaust gas outlet of the burner is connected to the exhaust gas system of the internal combustion engine upstream of the exhaust gas aftertreatment system.

21. The internal combustion engine system according to claim 19, wherein the first heat source of the heat recovery assembly comprises at least one first heat exchanger connected to a waste heat source of the internal combustion engine, wherein the waste heat source is waste heat from at least one of the exhaust gas system, from a cooling system of the internal combustion engine, or from an exhaust gas recirculation system, the at least one first heat exchanger is arranged at least one selected from a group of upstream or downstream of the exhaust gas aftertreatment system, the first heat exchanger is arranged downstream of the exhaust gas aftertreatment system and a second heat exchanger is arranged upstream of the exhaust gas aftertreatment system, and wherein the second heat source is arranged at the working fluid circulation circuit between the first and the second heat exchanger, and the exhaust gas outlet of the burner is connected to the exhaust gas system of the internal combustion engine downstream of the second heat exchanger.

* * * * *